Aug. 28, 1934. E. C. BOOTH 1,971,595
FLEXIBLE TUBE CONSTRUCTION
Filed March 7, 1931
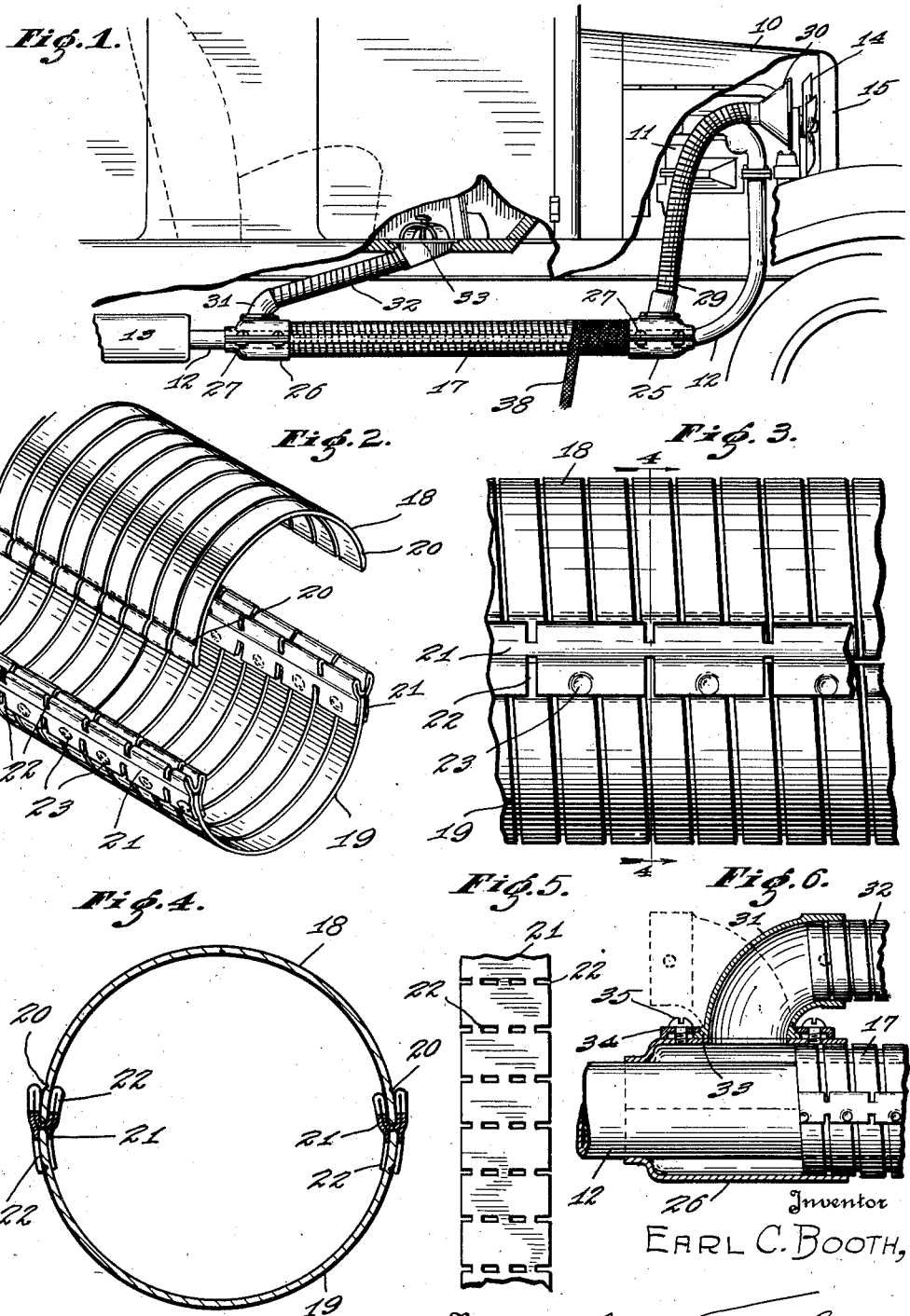
Inventor
EARL C. BOOTH,
By
Attorneys Patented Aug. 28, 1934

1,971,595

UNITED STATES PATENT OFFICE 1,971,595

FLEXIBLE-TUBE CONSTRUCTION

Earl C. Booth, Indianapolis, Ind., assignor to Noblitt-Sparks Industries, Inc., Indianapolis, Ind., a corporation of Indiana Application March 7, 1931, Serial No. 520,884

3 Claims. (Cl. 137—75)

My invention is concerned with automobile-body heaters of the type which derive heat from the exhaust pipe of the automobile engine. Such heaters usually comprise a casing which encloses the exhaust pipe for a portion of its length, the casing being provided with an air-inlet opening and an air-discharge opening, the latter being connected by a suitable conduit with the interior of the automobile body.

It is the object of my invention to construct a heater of this type in such a manner that it may be applied in a wide variety of situations. It is a further object of my invention to produce such a heater which can be simply and economically manufactured and which can be installed in the automobile without excessive trouble or effort.

In carrying out my invention, I make the body of the heater-casing in two parts both of which are preferably formed by slitting a flexible metallic hose along generally longitudinal lines. Along one edge of each pair of mating edges of the casing-parts, I provide a guide strip adapted to receive the adjacent edge of the other casing-part. This casing is adapted to be placed around the exhaust pipe of an automobile between two spaced heads which also surround the exhaust pipe and which serve as enclosures for the casing. Preferably, the inlet opening of the casing is located in one of these heads and the discharge opening in the other.

The accompanying drawing illustrates my invention: Fig. 1 is a side elevation of an automobile with parts thereof broken away to illustrate the manner in which a heater embodying my invention may be applied; Fig. 2 is a perspective view illustrating the two casing-parts in spaced relation; Fig. 3 is a fragmental side elevation of the casing; Fig. 4 is a transverse section on the line 4—4 of Fig. 3; Fig. 5 illustrates the shape of one of the guide strips before it is formed and applied to a casing-part; and Fig. 6 is an axial section through the head at the discharge end of the casing.

In the drawing, the automobile 10 is shown as having an engine 11 from which exhaust gases are conducted through an exhaust pipe 12 to a muffler 13. In accordance with common practice, the engine is shown as being equipped with a fan 14 which serves to draw air through the radiator 15 of the engine-cooling system.

As previously indicated, the body 17 of the heater casing is composed of two parts 18 and 19 formed by slitting a flexible metallic hose on generally longitudinal lines. In the drawing, the lines on which the hose is slit are shown as being diametrically opposite, but this is not essential. Preferably simultaneously with the slitting operation, each of the casing-parts 18 and 19 is crimped along a line parallel to and spaced slightly from the edge of the casing-part. Such crimping is illustrated in the drawing at 20. Flexible metallic hose of the type used in making my casing is formed of a helically wound strip so shaped in cross-section that adjacent turns interlock. The slitting of the casing, as is evident, divides each turn of this strip into two halves; and in the absence of the crimping, any turn-half could be separated from the adjacent turn-halves by circumferential movement. The crimping, however, crushes the turns of the helical strip where they overlap and prevents the relative circumferential movement which would result in separation.

Along one edge of each pair of mating edges of the casing-parts 18 and 19, I provide a flexible guide strip adapted to receive the adjacent edge of the other casing-part. This guide-strip is conveniently formed of a sheet-metal ribbon 21 provided with a multiplicity of transverse slots 22, as shown in Fig. 5. After the ribbon 21 is slotted, it is bent along longitudinal lines into a general Y-shaped cross-section, as shown in Fig. 4. The lower leg of the Y is formed by the two edges of the strip 21 which are spaced apart to receive between them one edge of one of the casing-parts. The other two legs of the Y are spaced apart to receive between them the adjacent edge of the other casing-part. As shown in the drawing, each edge of the casing-part 19 is shown as received in the lower leg of the Y of the guide strip, while the edges of the casing-part 18 are shown as being received in the space between the other two legs of the Y. Each of the guide strips is secured to the associated casing-part as by spot-welding indicated at 23. It is of course not essential that both guide strips be on the same casing-part.

When the casing is assembled around the exhaust pipe, the edges of the casing-part 18 are received in the guide strips 21. Because of the flexible character of the metallic hose from which the casing-parts are formed, the casing can be bent and/or twisted to follow any usual shape of exhaust pipe. Because of the presence of the slots 22 in each of the guide strips 21, these guide strips are transversely flexible, and the flexibility of the casing-part to which the guide strips are secured is not interfered with.

For the purpose of closing the ends of the casing 17 I provide heads 25 and 26. Each of these heads is formed in two parts in order that it may be clamped around the exhaust pipe 12 and the casing 17 as by means of the bolts 27. The head 25, which is shown as at the front end of the casing 17, is in communication with an air supply conduit 29 which extends to a point in rear of the fan 14 and is there provided with a funnel 30 that is adapted to receive air blown rearwardly by the fan and to direct such air into and through the conduit 29.

The head 26 at the rear end of the casing is provided with an air-discharge opening associated with which is an elbow 31. The upper end of the elbow 31 is connected to a flexible conduit 32 by means of which air discharged from the casing 17 is conducted to the interior of the automobile-body through a suitable register 33. At its lower end, the elbow 31 is formed to provide an outwardly directed annular flange 33 adapted to be received beneath an annular collar 34 which may be secured to the head 26 by means of screws 35. This method of attaching the elbow 31 to the head permits the elbow to be rotated to various positions of adjustment about the axis of the discharge opening in the head and adds greatly to the flexibility and ease of installation of the heater.

In installing the heater, the two casing-parts 18 and 19 are separately fitted to the exhaust pipe 12 and the edges of the casing-part 18 are brought into the grooves provided by the guide-strips 21. The heads 25 and 26 are then clamped in place by the bolts 27, one end of each of the heads closely embracing the exhaust pipe 12 and the other end receiving the casing 17. The conduits 29 and 32 are then installed in accordance with circumstances. To prevent the two casing-halves 18 and 19 from separating at points intermediate their length, the entire casing may be wrapped with a tape 38 of asbestos or other heat-resisting material.

I claim as my invention:

1. An article of manufacture, comprising a flexible metallic hose provided with two circumferentially spaced longitudinal slits dividing the hose into two sections, and two flexible joint-forming elements, each of said joint-forming elements being secured to one edge of one of said hose-sections and having a longitudinally extending U-shaped groove adapted to receive the adjacent edge of the other hose-section.

2. The invention set forth in claim 1 with the addition that each of said joint-forming elements is provided at intervals with transverse slots to increase its flexibility.

3. An article of manufacture, comprising a flexible metallic hose provided with a longitudinal slit along one side, the side of said hose opposite said slit being formed so that the edges of said slit can be separated, and a flexible joint-forming element secured to one of such edges and provided with a seat for the reception of the other, said joint-forming element having spaced transverse slots to increase its flexibility.

EARL C. BOOTH.